(12) United States Patent
Shan

(10) Patent No.: US 11,898,021 B2
(45) Date of Patent: Feb. 13, 2024

(54) POLYMERIC COMPOSITES WITH TUNABLE PROPERTIES

(71) Applicant: Wanliang Shan, Jamesville, NY (US)

(72) Inventor: Wanliang Shan, Jamesville, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 488 days.

(21) Appl. No.: 16/733,462

(22) Filed: Jan. 3, 2020

(65) Prior Publication Data

US 2020/0216630 A1 Jul. 9, 2020

Related U.S. Application Data

(60) Provisional application No. 62/788,653, filed on Jan. 4, 2019.

(51) Int. Cl.

| | |
|---|---|
| C08J 9/00 | (2006.01) |
| B29C 70/68 | (2006.01) |
| C08K 9/10 | (2006.01) |
| C08K 3/08 | (2006.01) |
| C08K 7/06 | (2006.01) |
| C08K 3/04 | (2006.01) |
| B29B 7/90 | (2006.01) |
| B29K 83/00 | (2006.01) |
| B29K 307/04 | (2006.01) |
| B29K 705/10 | (2006.01) |
| B29K 505/00 | (2006.01) |

(52) U.S. Cl.
CPC ............... *C08J 9/0085* (2013.01); *B29B 7/90* (2013.01); *B29C 70/68* (2013.01); *C08K 3/04* (2013.01); *C08K 3/08* (2013.01); *C08K 7/06* (2013.01); *C08K 9/10* (2013.01); *B29K 2083/00* (2013.01); *B29K 2307/04* (2013.01); *B29K 2505/00* (2013.01); *B29K 2705/10* (2013.01); *C08J 2203/06* (2013.01); *C08J 2383/04* (2013.01); *C08K 2003/0862* (2013.01); *C08K 2201/001* (2013.01)

(58) Field of Classification Search
CPC ..................................................... C08J 9/0085
See application file for complete search history.

(56) References Cited

U.S. PATENT DOCUMENTS

| | | | | |
|---|---|---|---|---|
| 4,276,394 A | * | 6/1981 | Kennedy ............... | C08F 293/00 526/221 |
| 9,748,015 B2 | * | 8/2017 | Mrozek ................... | H01B 1/24 |

(Continued)

*Primary Examiner* — William D Young
(74) *Attorney, Agent, or Firm* — David L. Nocilly; Bond Schoeneck & King PLLC

(57) ABSTRACT

A variety of polymeric composites with tunable mechanical stiffness and electrical conductivity are claimed herein. For example, the composite may have an elastomeric matrix, a plurality of tunable particles, and a plurality of conductive fibers embedded in the matrix. The composites may also be a tunable foam matrix and an elastomeric matrix. In some embodiments, the composites are a low melting point alloy (LMPA) foam infiltrated by an elastomer, whose stiffness can be tuned by more than two orders of magnitude through external heating. In other embodiments, the composite may be a conductive particle-fiber-matrix three-component composite capable of changing its elastic rigidity rapidly and reversibly when powered with electrical current.

10 Claims, 14 Drawing Sheets

(56) References Cited

U.S. PATENT DOCUMENTS

| | | | |
|---|---|---|---|
| 2015/0129276 A1* | 5/2015 | Shumaker | H01B 3/441 |
| | | | 174/69 |
| 2017/0321100 A1* | 11/2017 | Zhang | C09K 5/063 |
| 2018/0156204 A1* | 6/2018 | Lipton | F03G 7/06 |
| 2018/0242451 A1* | 8/2018 | Chopra | C09D 11/52 |

* cited by examiner

POLYMERIC COMPOSITES WITH TUNABLE PROPERTIES

CROSS-REFERENCE TO RELATED APPLICATIONS

The present application claims priority to U.S. Provisional No. 62/788,653, filed on Jan. 4, 2019.

STATEMENT REGARDING FEDERALLY SPONSORED RESEARCH OR DEVELOPMENT

This invention was made with government support under Grant Number 1663658 and 1830388 awarded by the National Science Foundation. The government has certain rights in the invention.

BACKGROUND OF THE INVENTION

1. Field of the Invention

The present invention relates to polymer matrix composites with tunable properties and, more specifically, to elastomeric composites having low melting point alloy reinforcement (continuous as foam or discontinuous as particles) as well as conductive fibers to provide tunable mechanical stiffness and electrical conductivity, among others.

2. Description of the Related Art

Composite materials with tunable mechanical stiffness are mechanically stiff under one set of conditions and soft or malleable under another. These smart composites have many practical applications in robotics. For example, smart composites with tunable stiffness can resemble artificial muscles and thus be deployed as actuators in robotics and assistive wearable devices. Dynamically tunable reversible stiffness enables the actuators to actively change their shapes and elastic rigidity to adapt to complex environments. Smart composites with tunable stiffness can also be used as tunable core in smart adhesives with dynamically tunable dry adhesion. These smart adhesives can be used as compliant grippers for pick-and-place manipulation in manufacturing and transfer printing, as well as locomotion mechanisms in climbing robots.

Existing approaches to variable stiffness can be roughly categorized into two different approaches: changing shape or geometry, and altering material properties. The second approach typically involves using smart materials with inherently variable properties such as shape memory polymers (SMP), shape memory alloys (SMA) and piezoelectric materials. These smart materials are categorized to adaptive materials and active materials. Adaptive materials are also known as semi-active materials, which include SMPs, SMAs, magneto-fluids and electro-rheological fluids. Since adaptive materials have low energy requirement, by external stimulation they can experience mechanical property changes. Active materials convert external energy such as electrical or thermal energy into mechanical strain energy and vice versa. Examples include piezoelectric materials.

However, conventional composite materials with tunable mechanical stiffness suffer from many drawbacks, such as slow actuation, insufficient change in mechanical stiffness, poor reversibility, etc. As such, there exists a need in the art for a new generation of composite materials with improved tunable properties including mechanical stiffness and methods by which stiffness can be controlled and these drawbacks avoided.

BRIEF SUMMARY OF THE INVENTION

The present invention comprises various embodiments of polymer matrix composites that can be dynamically manipulated to control their properties. The composites described herein provide an ability to dynamically and reversibly control their mechanical stiffness. In some embodiments, the composite can comprise an elastomeric matrix that is reinforced with tunable particles and conductive fibers. In other embodiments, the composite can comprise a tunable foam matrix and an elastomeric matrix. Such composites have a stiffness (or rigidity or modulus) that can be dynamically tuned through a temperature change, such as through the application of heat (e.g., by way of applying a voltage), and/or a heater component capable of heating the interface between the composite and an opposing substrate.

The composite embodiments described herein are reusable and robust, which provides an advantage over conventional composites with tunable stiffness. Such composites can be used in a variety of applications, including but not limited to, applications whereby a substrate is to be manipulated (e.g., by changing its position or other spatial or physical changes), such as robotics (e.g., pick-and-release robotic manipulators and/or climbing robots), manufacturing/assembly processes (e.g., transfer printing), and other applications where quick pick-and-release of substrates, particularly flat, rigid substrates are needed.

One embodiment of the present invention comprises a low melting point alloy (LMPA) foam and an elastomer, whose stiffness can be tuned by more than two orders of magnitude through external heating. The proposed composite is rigid as metal at temperatures below the melting point of the LMPA (47° C.) and it behaves like a soft material at higher temperatures when the LMPA foam melts. To fabricate the smart composite, first a metal foam made of the LMPA is fabricated, then an uncured elastomer of liquid form (e.g. PDMS) is infiltrated into the percolating pores of the metal foam. The mixture is then heated up for the elastomer to cure. The resultant composite is much lighter than the metal in bulk form while its stiffness is comparable to the metal in bulk form and can be much reduced when heated. It is also more reliable and robust in terms of reusability.

Another embodiment of the present invention comprises a conductive three-component composite capable of changing its elastic rigidity rapidly and reversibly when powered with electrical current. The material is composed of polydimethylsiloxane (PDMS), Field's metal (FM) particles, and nickel coated carbon fibers (NCCF). The mechanical rigidity and the electrical conductivity of the composite are functions of the volume fractions of the PDMS, FM particles and NCCF used in the fabrication process, as well as the shapes, sizes, and anisotropy of the FM particles and NCCF fibers. The material is in its rigid state at the room temperature and softens when electrically actuated above the melting temperature of FM at 62° C. This property allows the material to stretch in the soft state and hold the stretched configuration in the rigid state. Since the rigidity switches at a relatively low temperature, the phase change of FM particles in the matrix can be achieved with a reasonably low power requirement.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 1 an embodiment of a three-component composite according to the present invention;

Figure 8:
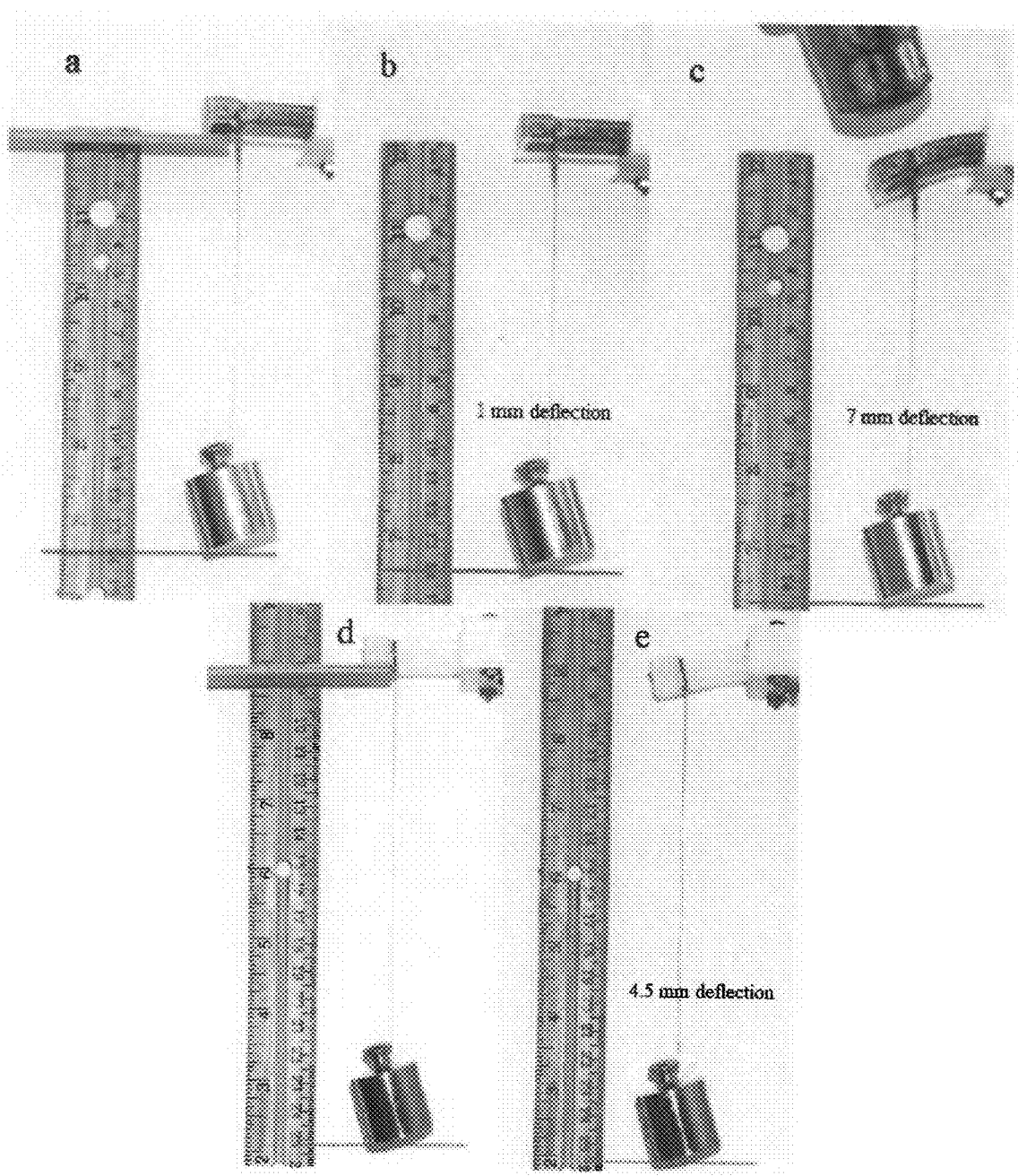
Figure 9:
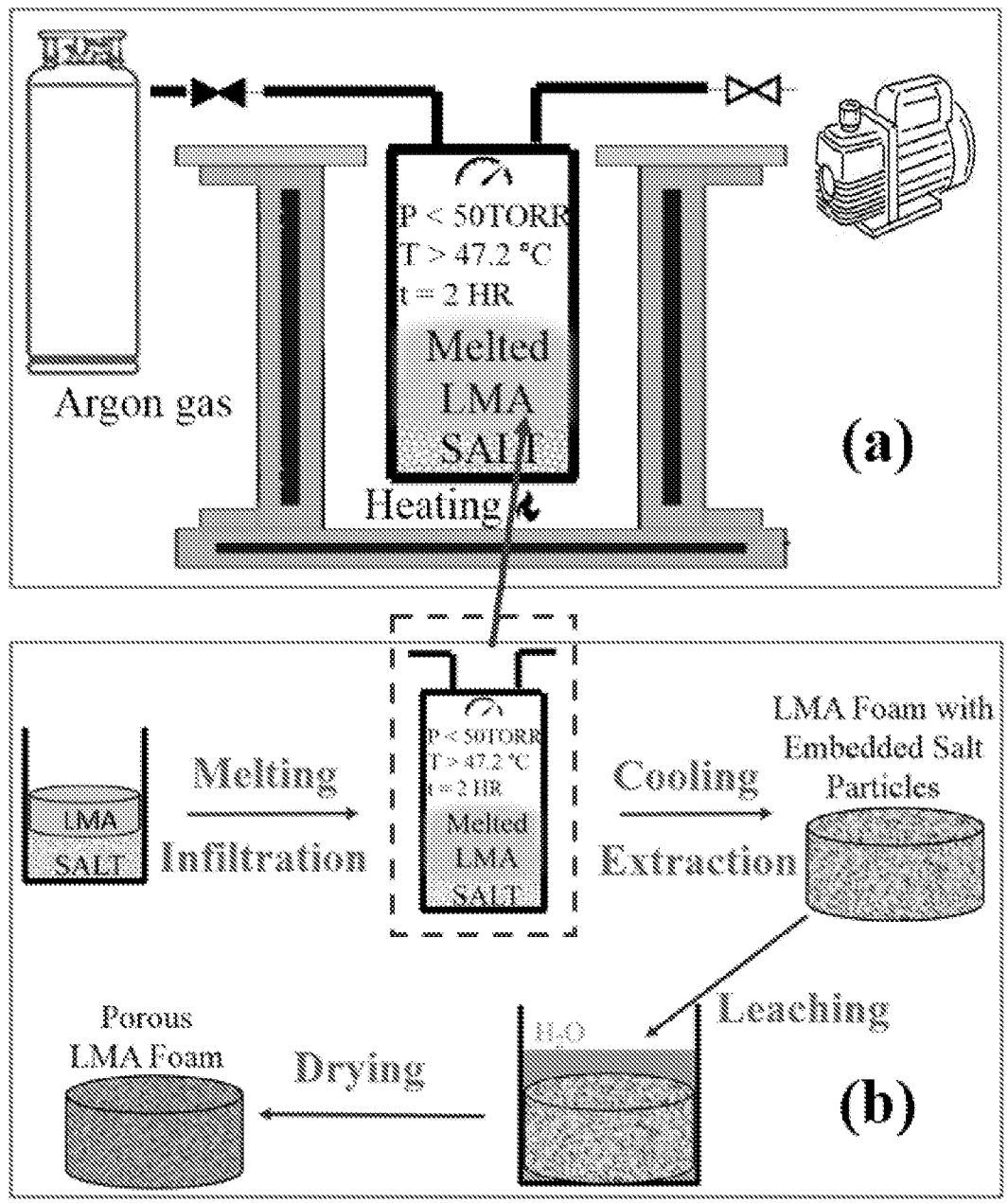
Figure 10:
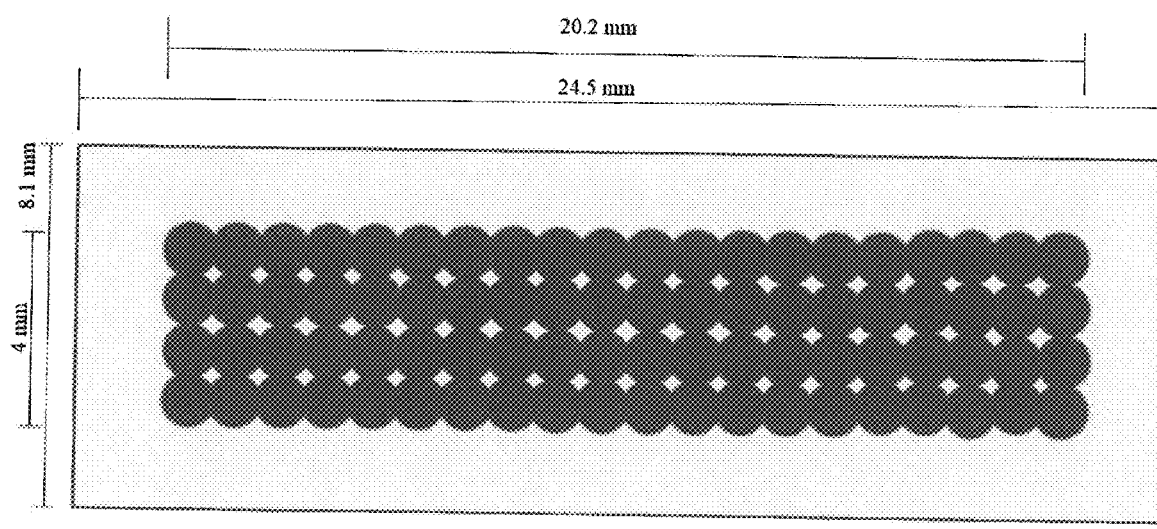
Figure 11:
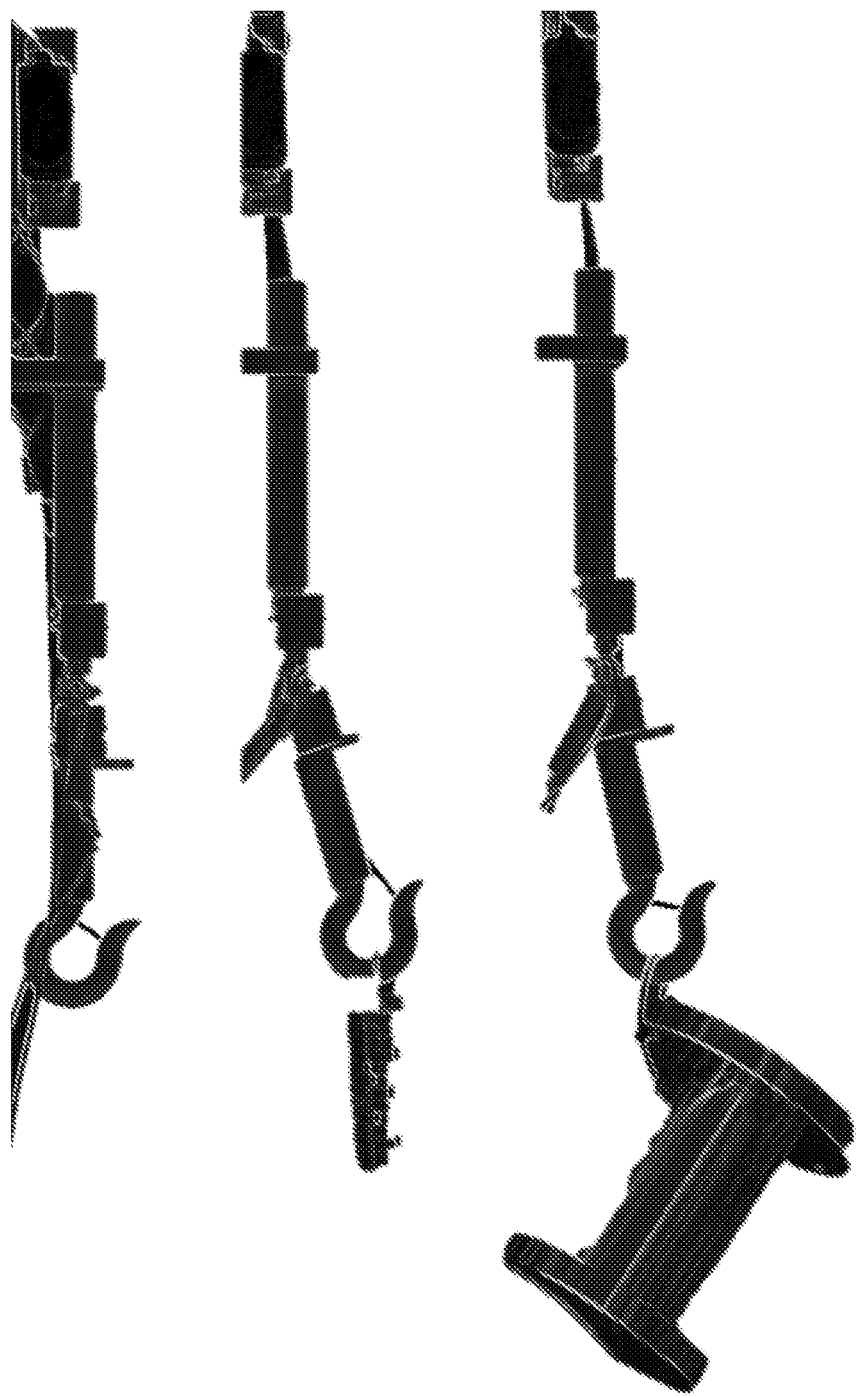
Figure 12:
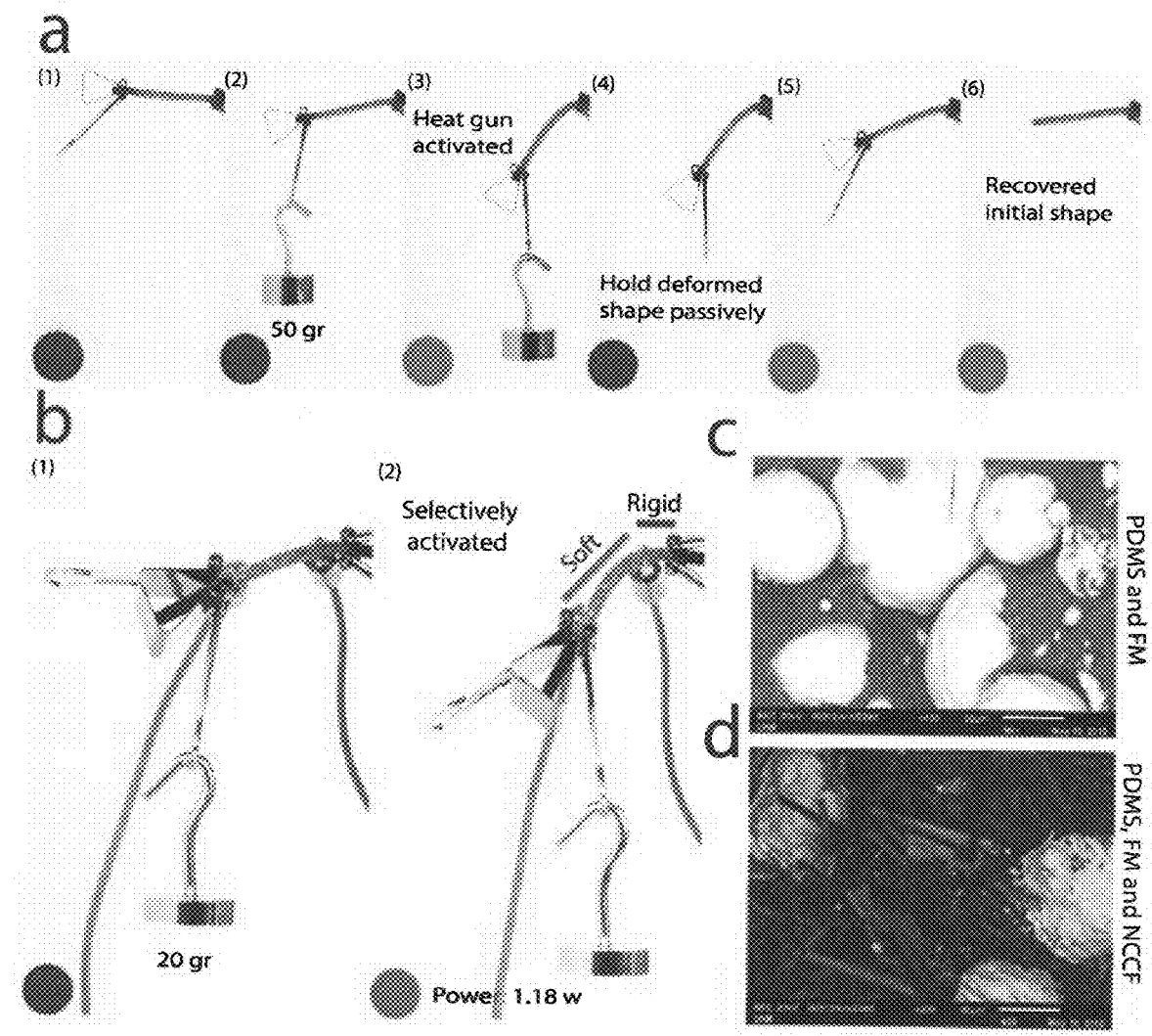

FIG. 8 is a series of images of: (a) a non-activated composite beam with no dead-weight applied; (b) a non-activated composite beam with 100 g dead weight applied at its free end; (c) an activated composite beam with 100 g dead-weight applied at its free end; (d) a solid PDMS beam with no dead-weight applied; and (e) a solid PDMS beam with 100 g dead-weight applied at its free end;

FIG. 9 is a schematic of an approach for fabricating an LMPA foam matrix according to the present invention;

FIG. 10 is a schematic of an LMPA foam composite according to the present invention;

FIG. 11 is a series of images showing a robotic arm constructed using an LMPA foam composite according to the present invention;

FIG. 12 is a series of images of (a, b) snapshots showing operation of an electrically conductive stiffness tunable composite according to the present invention; (c,d) Scanning electron microscopy comparing microstructures of the PDMS-FM composite and PDMS-FM-NCCF composite.

Figure 13:
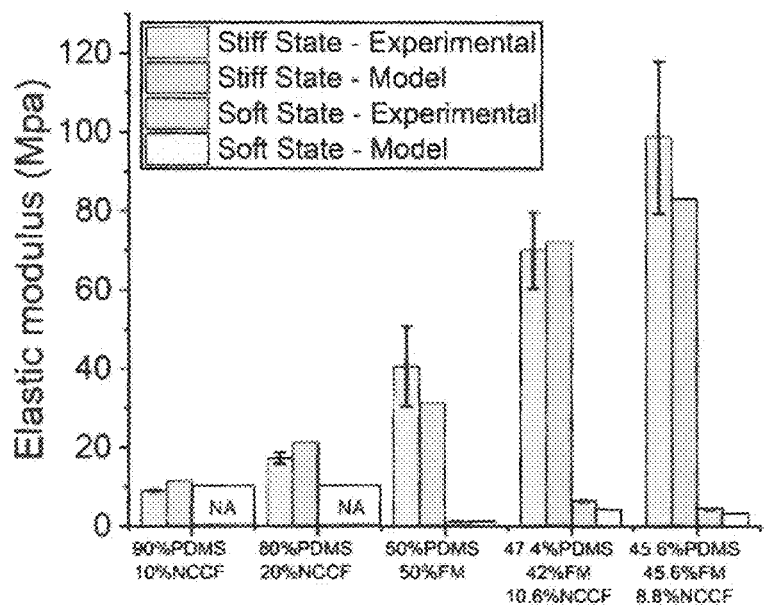
Figure 13:
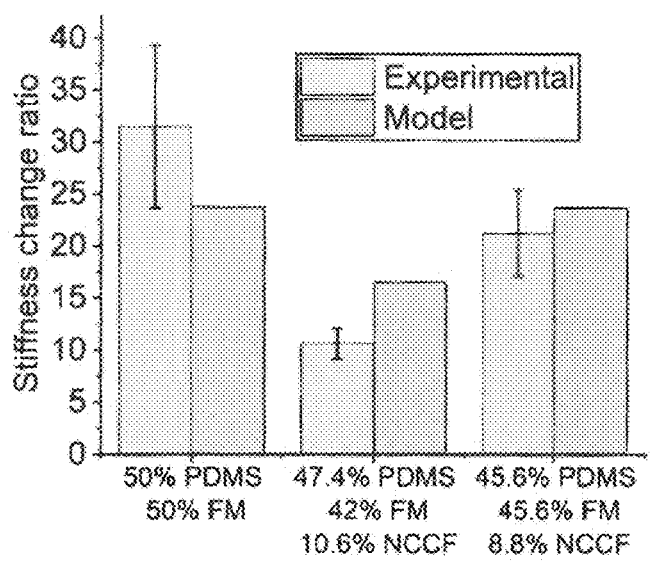
Figure 14:
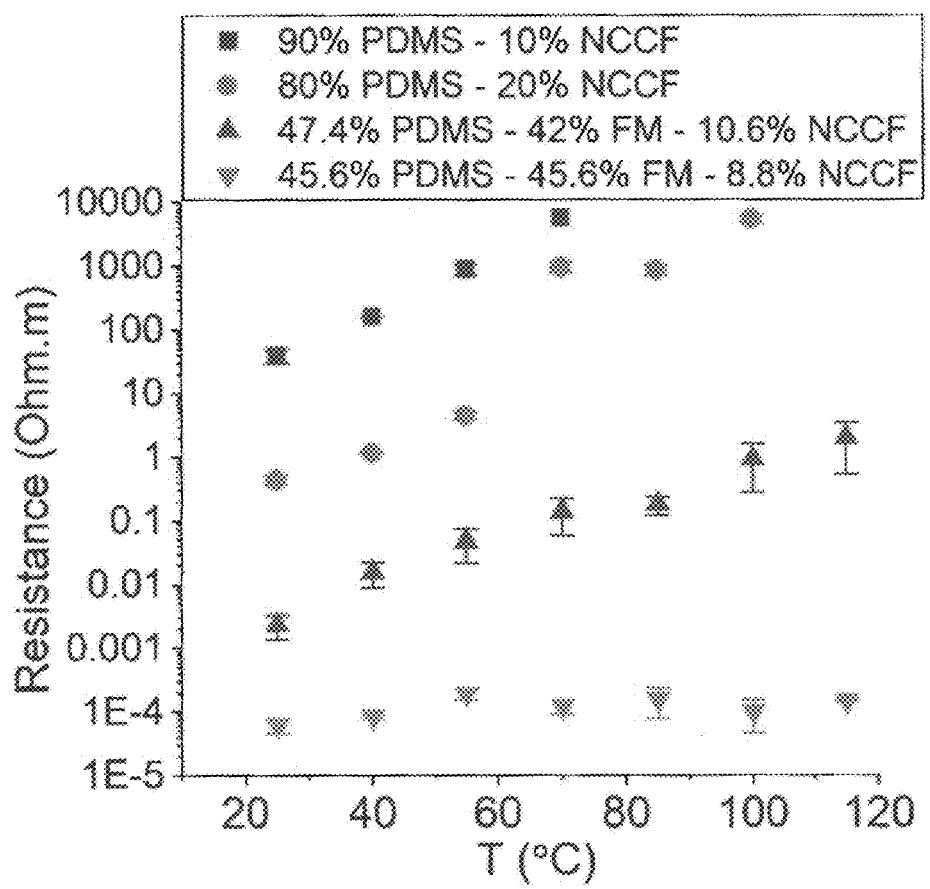

FIG. 13 is a series of graphs of (a) the elastic modulus of PDMS-NCCF, PDMS-FM and PDMS-FM-NCCF composites according to the present invention in the rigid and soft states compared with the values obtained from the model, and (b) the stiffness change ratio of PDMS-FM and PDMS-FM-NCCF composites according to the present invention; and FIG. 14 is a graph of the electrical resistance of PDMS-NCCF and PDMS-FM-NCCF composites according to the present invention in different operating temperatures.

DETAILED DESCRIPTION OF THE INVENTION

Figure 1:
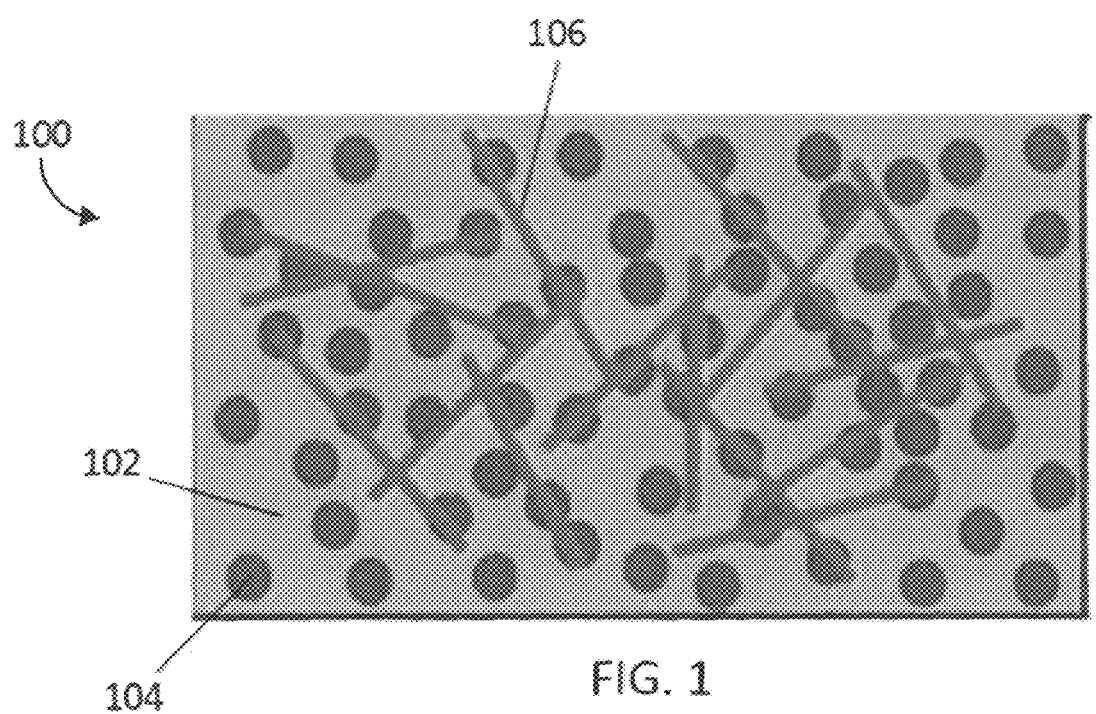

Referring to the figures, wherein like numeral refer to like parts throughout, there is seen in FIG. 1 a composite 100 according to one embodiment of the present invention that comprises an elastomeric matrix 102 having a plurality of tunable particles 104 and a plurality of conductive fibers 106 embedded therein. Composite 100 can be rigid at room temperature and can become soft when heated.

Further with reference to FIG. 1, elastomeric matrix 102 can comprise one or more elastomers. The elastomers can have a low elastic modulus (e.g., 10 kPa-1 MPa). Exemplary elastomers include, but are not limited to, PDMS, Ecoflex® (a platinum-catalyzed silicone material), Elastosil® (silicone rubber-based materials consisting essentially of silicone polymers and fillers), and combinations thereof.

Tunable particles 104 are particles that can be capable of rigidity tuning, that is, they are capable of converting from being rigid to being flexible or vice versa. The tunable particles can be orders of magnitude more rigid (stiffer) than the elastomeric matrix at room temperature. Materials capable of rigidity tuning include materials that are susceptible to heat such that the material softens (e.g., the Young's modulus of the material is reduced) when exposed to a particular temperature or electrical current. In some embodiments, the tunable particles comprise a material that is rigid at room temperature, but that becomes soft/flexible when heated to a temperature above either the material's glass transition temperature and/or its melting point. In some embodiments, materials having a glass transition temperature of 75° C. can be used, which permits a fast activation for rigidity tuning. In some embodiments, the material can be less rigid at room temperature and more rigid at temperatures below room temperature.

Exemplary tunable particle materials include, but are not limited to, Low Melting Point Alloys (LMPA), such as Galinstan (having a melting point of −19° C.), Eutectic Gallium Indium (EGaIn) (having a melting point of 15.5° C.), Field's metal (having a melting point of 62° C.), as well as Bismuth-based alloy metals (e.g., an alloy having a melting point of 47.2° C.). Due to their extremely low electrical resistivity ($\sim 3 \times 10^{-7}$ W·m), LMPAs are suitable for micro-scale embodiments of the composites, where fast activation by a small sized power supply, such as a battery, is possible.

Referring to FIG. 1, composite 100 can further comprise a plurality of conductive fibers 106. For example, the composite can comprise a plurality of nickel coated carbon fibers (NCCF) of approximately 0.1 mm length. In other embodiments, silver coated carbon fibers (SCCF) can be used. In some embodiments, the fiber length can be between approximately 10 μm to 500 μm.

In some embodiments, the composite can further comprise air bubbles. The introduction of air bubbles to the composite can allow the composite to have a tunable thermal expansion coefficient. Air bubbles can be introduced to the composite by not degassing the composite during its preparation. The existence of air bubbles within the composite can increase the thermal expansion coefficient of the composite when the composite is heated.

Figure 4:
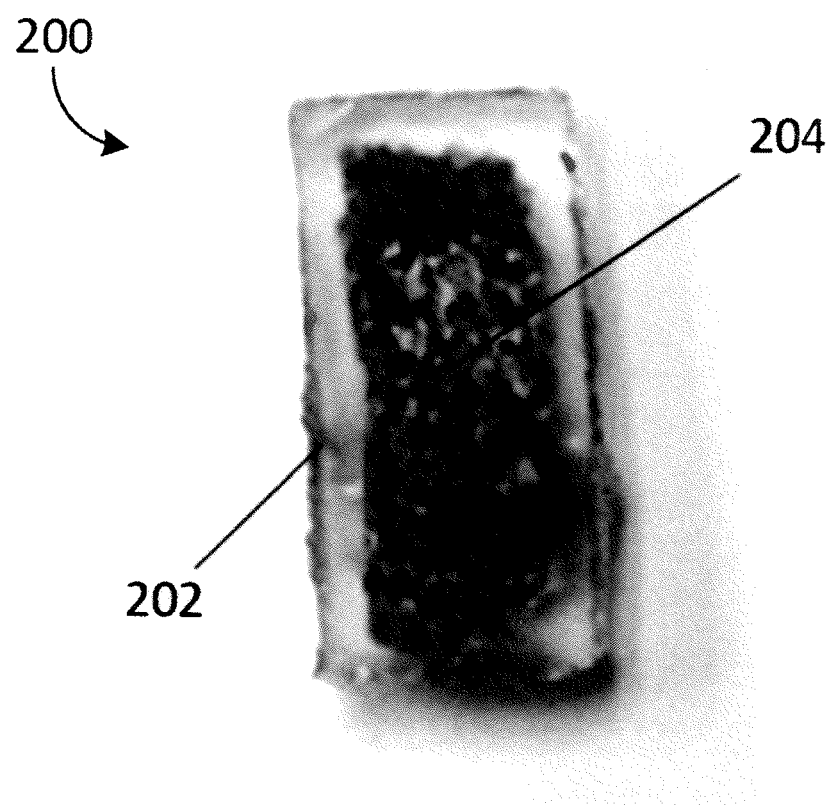
FIG. 4 is an embodiment of a LMPA foam-elastomer matrix composite according to the present invention.

Referring to FIG. 4, in other embodiments, composite 200 can comprise a bicontinuous network of two matrices, an elastomeric matrix 202 and a tunable foam matrix 204. Elastomeric matrix 102 can comprise one or more elastomers. The elastomers can have a low elastic modulus (e.g., 10 kPa-1 MPa). Exemplary elastomers include, but are not limited to, PDMS, Ecoflex® (a platinum-catalyzed silicone material), Elastosil® (silicone rubber-based materials consisting essentially of silicone polymers and fillers), and combinations thereof.

Also with reference to FIG. 4, tunable foam matrix 204 can be capable of rigidity tuning, that is, it is capable of converting from being rigid to being flexible or vice versa. The tunable foam matrix can be orders of magnitude more rigid (stiffer) than the elastomeric matrix at room temperature. In particular disclosed embodiments, materials capable of rigidity tuning include materials that are susceptible to heat such that the material softens (e.g., the Young's modulus of the material is reduced) when exposed to a particular temperature or electrical current. In some embodiments, the tunable particles comprise a material that is rigid at room temperature, but that becomes soft/flexible when heated to a temperature above the material's melting point. In some embodiments, the material can be less rigid at room temperature and more rigid at temperatures below room temperature.

The tunable foam matrix (e.g., tunable foam matrix 204) can comprise a low melting point alloy (LMPA). The stiffness of the composite can be tuned by inducing phase changes in the LMPA component. Below the melting point of the LMPA, the composite behaves like a solid metal and is stiff. Above the melting point, the LMPA will be liquid, therefore the mechanical properties of the polymer matrix dominate the composite's mechanical properties, and the composite behaves like a soft material.

Figure 5:
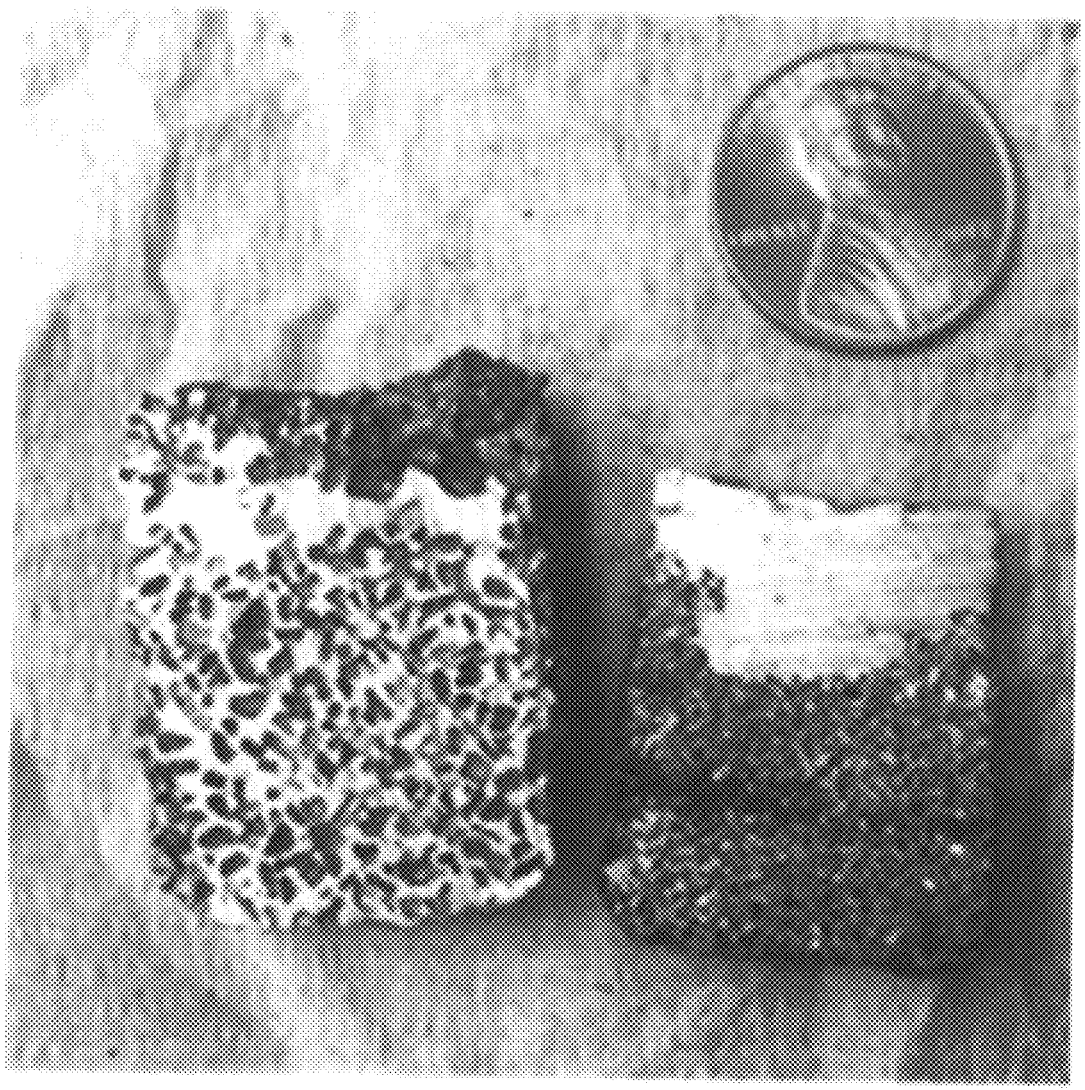
FIG. 5 shows two embodiments of a tunable foam matrix for use in a composite according to the present invention.
Figure 6:
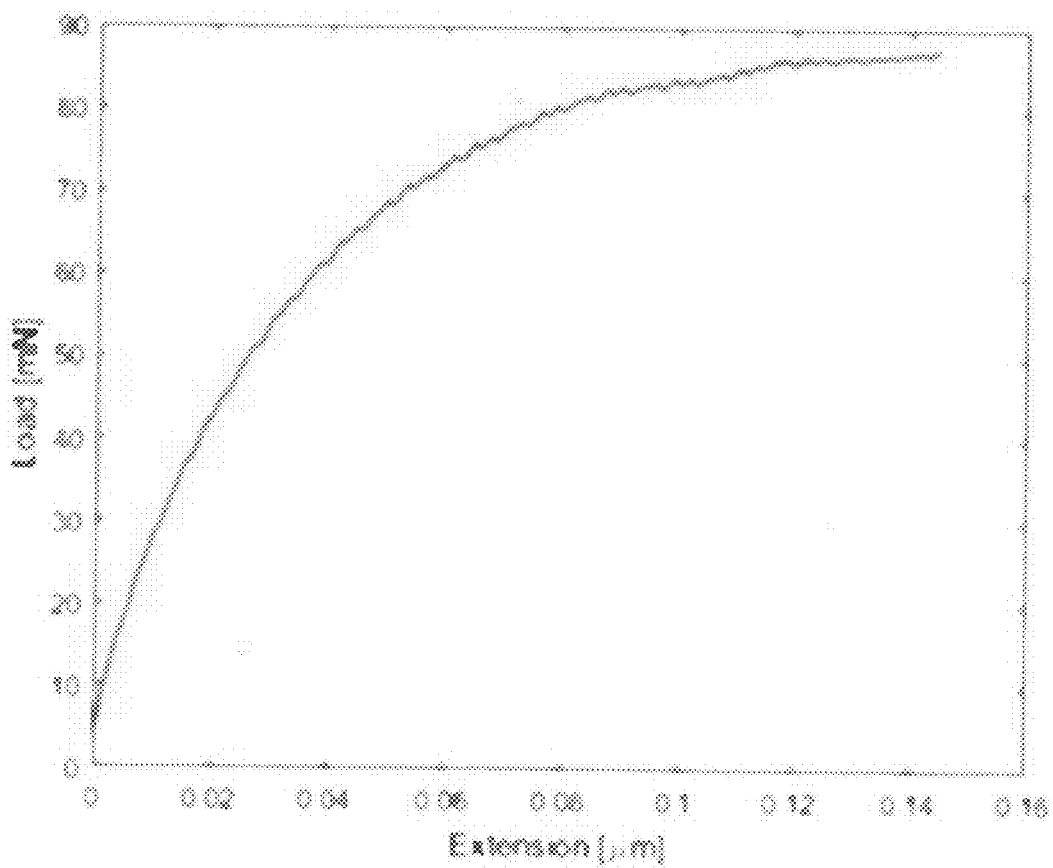
FIG. 6 is a typical load extension strain plot for various samples of an exemplary tunable foam matrix according to the present invention.

Exemplary LMPAs include "Roto117F Low Melt Fusible Bismuth Based Ingot Alloy" (Roto117F) (with a melting point of 47° C.), Galinstan (with a melting point of −19° C.), Eutectic Gallium Indium (EGaIn) (with a melting point of 15.5° C.), Field's metal (with a melting point of 62° C.). Due to their extremely low electrical resistivity ($\sim 3 \times 10^{-7}$ W·m), LMPAs are suitable for micro-scale embodiments of the composites, where fast activation by a small sized power supply, such as a battery, is possible. FIG. 5 shows two exemplary Roto117F foam matrices having differently sized pores. In some embodiments, the pores can have diameters of approximately 1 mm, but in other embodiments the pores can have smaller diameters. FIG. 6 (*a, b*) shows additional exemplary Roto117F foam matrices.

In use, composites having tunable mechanical stiffness can be used, for example, in applications such as compliant robotic needle applications. In other uses, the composite can be embedded within an elastomer shell for tunable dry adhesion applications, such as, for example, applications described in WO2018/144618, incorporated by reference herein in its entirety.

As mentioned briefly above, embodiments of the above-described composites can be embedded within an elastomer shell and the elastomer-composite structure can be used for dynamically tunable dry adhesion of substrates. Examples of suitable substrates include, but are not limited to, substrates comprising acrylic polymers (e.g., polyacrylates or polyalkylmethacrylates, such as polymethylmethacrylates, polyethylmethacrylates, or polypropylmethacrylates), polyurethanes, polycarbonates, polyesters, polyalkyterephthalates (e.g., polyethyleneterephthalate (PET), polypropyleneterephthalates, or polybutyleneterephthalates), polyvinyl chloride (PVC), polyethers, polyamides, polyimides, glycol-modified polyethylene terephthalate, polysiloxane or copolymers thereof. In yet additional embodiments, the substrates can comprise metals, such as, but not limited to, galvanized steel, stainless steel, copper, nickel, aluminum, superalloys, gold, silver, tungsten, molybdeunm, tantalum, brass; mineral substrates, such as, but not limited to, silica, silicon, silicon dioxide, quartz, diamond, sapphire; ceramic substrates; tile substrates; glass substrates; or mixtures or combinations of any of the above.

Any sized substrate can be utilized in the methods disclosed herein. The substrate also can be of any shape and thickness. In particular, the substrate should be sufficiently smooth so as to suitable for adhering to the elastomer-composite structure through dry adhesion. Exemplary substrates include, but are not limited to, semiconductor wafers, displays (e.g., cellular phone displays), glass sheets, smooth metal components, and the like.

The composites described herein can be used according to the following exemplary methods. A composite can be embedded within an elastomer to form an elastomer-composite structure. The elastomer-composite structure can adhere (through dry adhesion) to a substrate, and the substrate's position can thus be modified by moving the composite to which it is adhered. The elastomer-composite structure can then be heated to reduce dry adhesion between the substrate and the elastomer-composite structure, thereby detaching the substrate. In some embodiments, methods can comprise an additional cooling step.

Adhering the substrate to the elastomer-composite structure can comprise contacting the substrate with the composite in a manner that promotes dry adhesion between the substrate and a portion of the elastomer-composite structure. In some embodiments, dry adhesion between the substrate and the elastomer-composite structure can occur by placing the elastomer-composite structure on a surface of the substrate (e.g., the top surface or bottom surface of the substrate) and allowing the two components to adhere together through macroscopically short-range van der Waals forces.

While the substrate is adhered to the elastomer-composite structure, the substrate's position can be modified. For example, the substrate can be moved from one location to another in any direction such as by moving the substrate vertically or horizontally. The substrate also can be modified in other spatial orientations (e.g., turned, flipped, or other such movements) by using the elastomer-composite structure to control such movements.

When desired, the substrate can be detached from the elastomer-composite structure by heating the composite in a manner sufficient to reduce the dry adhesion between the substrate and the elastomer-composite structure. In particular, the elastomer-composite structure can be heated externally and internally. External heating can involve exposing the elastomer-composite structure to a heated environment (e.g., hot air or radiant heat) or simply allowing the elastomer-composite structure to warm to room temperature. Internal heating can occur by exposing the elastomer-composite structure to an electrical current (e.g., resistive heating). By heating the elastomer-composite structure, the physical and/or chemical properties of the elastomer-composite structure can be altered such that the composite becomes less rigid (or stiff) than it is before heating.

In embodiments utilizing an electrical current to heat the composite (either alone or as part of an elastomer-composite structure), the electrical current can be provided at a particular activation voltage, which can be selected based on the structural features of the composite as described herein. In some embodiments, the activation voltage can be applied repeatedly and intermittently using a battery.

The composite can be exposed to the electrical current for a sufficient amount of time as to heat the entire composite. In particular, the amount of time needed to heat the composite can be increased or reduced by varying the activation voltage used. Higher activation voltages utilize less heating time, whereas lower activation voltages utilize more heating time.

Example 1

A. Method of Making the Composite

In this example, a composite comprising PDMS, Field's Metal, and nickel coated carbon fibers is described. To create the composite, Field's Metal is mixed into part A (Base) of a PDMS kit using a mortar and pestle for approximately 4-5 minutes, until a desired Field's Metal particle size between approximately 5 and 50 µm is achieved. The mixing procedure is performed over a heating element (e.g., a hot plate)

having a temperature at or above 62° C., to avoid solidification of the liquid Field's Metal during shear mixing. After mixing, the Field's Metal emulsion is cooled for approximately 20 minutes inside a freezer (at a temperature of approximately −6° C.) and then is exposed to room temperature for approximately 20 minutes. The Field's Metal emulsion is then mixed with part B (curing agent) of the PDMS kit using a mortar and pestle.

Figure 2:
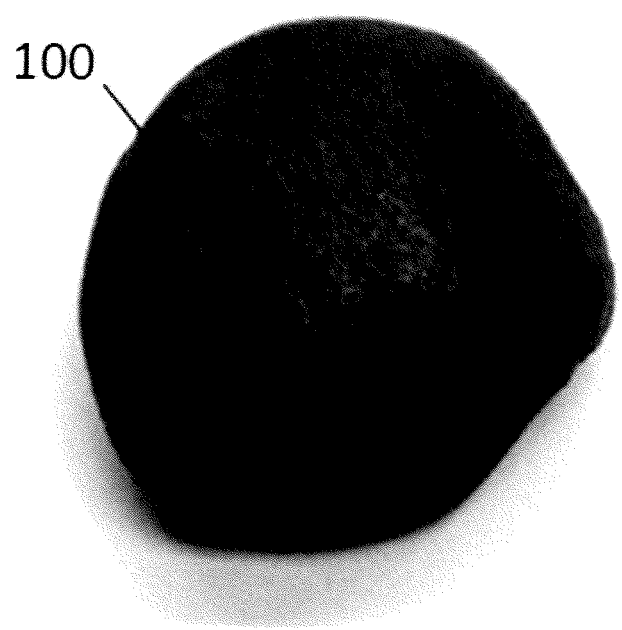
FIG. 2 is an embodiment of a three-component composite according to the present invention shown during the mixing procedure.
Figure 3:
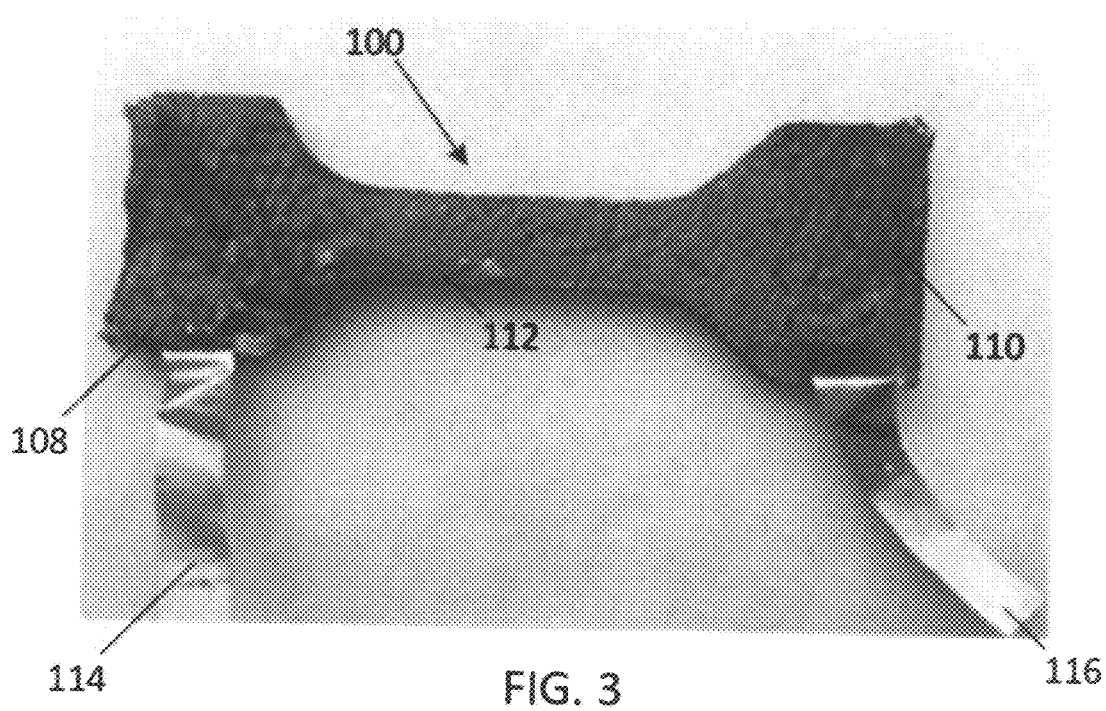
FIG. 3 is an embodiment of a three-component composite according to the present invention shown in a 'dog-bone' configuration after mechanical testing.

Once mixed, nickel-coated carbon fibers (NCCF) are blended into the mixture to form a high viscosity paste (see FIG. 2). Referring now to FIG. 3, the paste is then pressed into a "dog-bone" shaped mold to form a dog-bone configuration having a first end portion 108, a second end portion 110, and a central portion 112 with a width that is smaller than the widths of the first and second end portions. First and second electrodes 114, 116 comprising strips of copper are inserted into the first and second end portions 108, 110. The composite is then cured in the oven for approximately 120 minutes at approximately 60° C.

B. Evaluation and Results

Two composite samples having different volume fractions were tested. The elastic moduli were evaluated for the non-activated (i.e., stiff) state and the activated (i.e., soft) state of the composites. The first composite sample contains 45.9% Field's Metal, 45.9% PDMS, and 8.2% NCCF in terms of volume fraction, and the second composite contains 29% Field's Metal, 59.6% PDMS, and 11.4% NCCF. The second composite is not electrically conductive, indicating that the particles and fibers do not form a percolative network.

A heat gun was used to activate both the samples. A thermal camera was used to check the temperature of the samples prior to beginning the activated-state tests, in order to ensure that the temperature of each sample was higher than 62° C. and each sample was in the activated state.

The results of these tests are provided by Table 1, which includes data for two samples (A and B) of each composite. Each sample was tested a minimum of five times and the data was averaged to form a result.

TABLE 1

| E (MPa) | $E_{Nonactivated}$ | $E_{Activated}$ | $E_{Nonactivated}/E_{Activated}$ |
|---|---|---|---|
| Sample 1A | 27.98 ± 2.75 | 6.46 ± 0.74 | 4.33 |
| Sample 1B | 23.09 ± 1.98 | 4.58 ± 0.22 | 5.05 |
| Sample 2A | 12.40 ± 1.66 | 4.32 ± 0.07 | 2.86 |
| Sample 2B | 9.54 ± 1.53 | 3.54 ± 0.45 | 2.70 |

For the conductive composite samples (1A and 1B), the non-activated stiffness was approximately five times greater than the activated stiffness, while for the non-conductive composite samples (2A and 2B), the non-activated stiffness was less than three times greater than the activated stiffness. The mechanical stiffness is related to the electrical conductivity of the composite material.

Example 2

Figure 7:
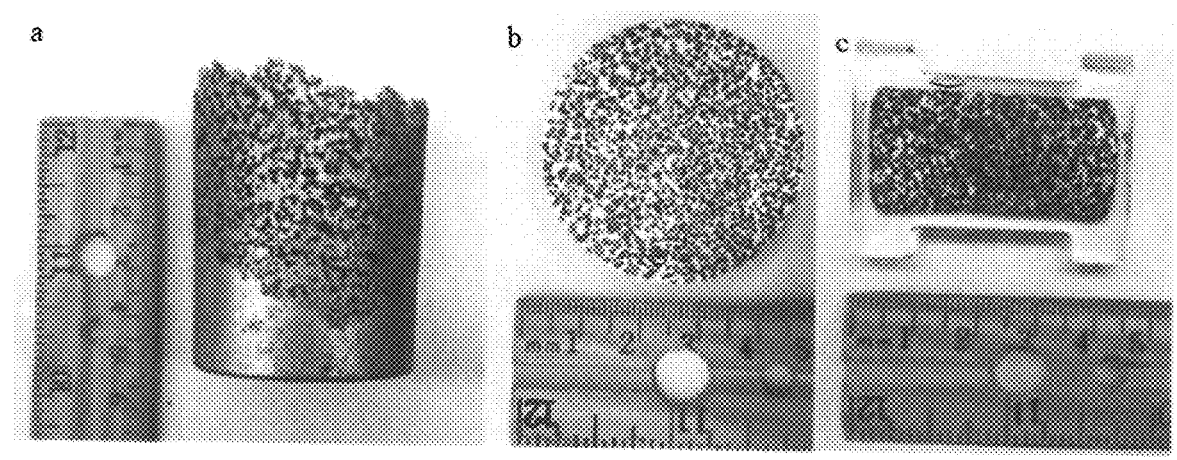
FIG. 7 is a series of images of a metal foam composite according to the present invention.

Another embodiment of the present invention comprises a polymer-metal composite material which has adjustable stiffness. The composite material is a bicontinuous network of two foams, one elastomeric, made of polydimethylsiloxane (PDMS), and the other metallic, made of low melting point alloy. The stiffness of the composite can be tuned by inducing phase changes in its low melting point alloy component. The low melting point alloy melts at 47° C. Below the melting point, the composite behaves like a solid metal and is stiff. Above the melting point, the alloy will be liquid, therefore the mechanical properties of the polymer foam dominate the mechanical properties of the composite, and the composite behaves like a soft material. The low melting point alloy is "Roto117F Low Melt Fusible Bismuth Based Ingot Alloy" with a high elastic modulus (E≅8.5 GPa) at room temperature. PDMS has an elastic modulus (E≅2 MPa). This combination makes possible a large range of shape morphing with little resistance to deformation when activated. FIG. 6 shows the metal foam and the composite. Moreover, a composite beam in both activated and non-activated cases with its deflections are illustrated in FIG. 7. Also, a sample of solid PDMS with the same geometry of the composite beam is shown in FIG. 7 with its deflections, as a comparison to the composite beam.

To fabricate this bicontinuous structure, a network of pores may be fabricated in the low melting point alloy first. The network of pores may be formed using conventional approaches, such as the making of open cell aluminum foams using a replication technique that can produce open cell aluminum foams with different pore sizes and volume fraction. An experimental setup is illustrated in FIG. 8.

The first step in fabricating this embodiment is pouring the NaCl particles into the mold cylinder. The next step is placing the prepared metal on top of the NaCl particles. After that step, the lid of the mold is sealed with a soft washer. At this stage, the top of the lid should be attached to the valve system, making sure that all valves of the system are closed. Next, the mold is placed on a hot plate that is off. The hot plate is then turned on and the temperature is set to 86° C. The valve leading to the vacuum pump and the mold is then opened, with the lid valve left open for 4 hours. Next, all the valves of the system are closed. The main valve on the argon gas tank is then opened and the infiltration pressure is set with the regulator valve (120 psi). The valve of argon gas is left open until the mold completely cools. Next, the valve system is detached, and the mold lid removed. The salt-LMPA foam is then taken out from the mold and cut using a saw. Finally, the salt-LMPA foam is placed in a beaker with water and a magnetic stirring bar on a stirring plate to dissolve the NaCl preform. The next step is to fill the pores in the LMPA foam with PDMS by embedding the foam into a 3D-printed mold, casting uncured PDMS into the mold, and then curing the PDMS.

The composite at the room temperature and temperatures below the melting point of the LMPA (47° C.) is rigid and can hold external load without much deflection as shown in FIG. 7(b).

The Young's modulus of a metal foam sample with 40% porosity was calculated. Dimensions of the sample that was made and tested can be seen in the FIG. 9. The value of the Young's modulus determines the elastic rigidity of materials. Young's moduli of the non-activated and activated states of the composite have been obtained to be 425.02 MPa and 1.51 MPa, respectively. These values are calculated using the following equations in which $A_{PDMS}=32.32$ mm$^2$ and $A_{Foam}=48.48$ mm$^2$. The schematic of composite that we did the calculation for is depicted in FIG. 9.

$$E_{non-act} = \frac{A_{PDMS}E_{PDMS} + A_{Foam}E_{Foam}}{A_{PDMS} + A_{Foam}} \quad (1)$$

-continued $$E_{act} = \frac{A_{PDMS}E_{PDMS} + A_{Foam} \times 0}{A_{PDMS} + A_{Foam}} \quad (2)$$

A motorized tensile test machine (Instron 6959) has been used to measure the effective Young's modulus of the composite. Table 2 shows the dimensions of all samples that have been tested.

Tensile tests have been performed on the metal foams at the room temperature when the metal is solid. It's a good indication of the Young's modulus of the final composite since the Young's modulus of the polymer (PDMS) is negligible when compared to the Young's modulus of the foam at room temperature. It should be mentioned that the Young's modulus is obtained by calculating the slope of the experimental stress-strain plots.

TABLE 2

| Sample number | Width (mm) | Thickness (mm) | Length (mm) |
| --- | --- | --- | --- |
| 1 | 15 | 3.64 | 10.70 |
| 2 | 14.4 | 3.70 | 10.67 |
| 3 | 14.97 | 3.92 | 10.03 |

Tensile tests were conducted on the specimens described above to measure the Young's modulus. These metal foams are of different porosity including low porosity 30%-40%, medium porosity 40%-50% and high porosity 50%-70%. The testing results are shown in Table 3. The Young's moduli of the composite samples at room temperature was determined to be 547.7±81.9 MPa, 369.3±7.6 MPa, and 620.0±26.1 MPa. The differences in the Young's moduli can be caused by the varying porosities of each sample.

TABLE 3

Young's modulus of the metal foam

| Sample number | 1st test | 2nd test | 3rd test |
| --- | --- | --- | --- |
| 1 | 637 MPa | 476 MPa | 530 MPa |
| 2 | 364 MPa | 366 MPa | 378 MPa |
| 3 | 622 MPa | 645 MPa | 593 MPa |

The stiffness of the composite material varies significantly by changing the temperature. Shape-memory actuation can be achieved by using this material. It means that it can be reshaped into different rigid structures and also stores energy in the elastomer. Moreover, it has shape memory capability. If deformed at elevated temperatures and then cooled down, increasing the temperature causes the composite to return to its original shape. By taking advantage of these capabilities, multifunctional tools can be designed and implemented when rigid structures are reformed into new shapes.

Referring to FIG. 10, a robotic arm is fabricated using a servomotor combined with a composite according to the present invention. The robotic arm has one degree of freedom. It allows the arm to bend in one direction. The composite has been used as a joint with variable stiffness. In the non-activated case, it is rigid and able to hold heavy weights. However, it behaves like a soft material when activated, and thus will bend much under the same heavy weights. FIG. 10 (a) shows the arm without any force applied, after activation via a heater it can easily be bent using the force applied by the servomotor, and after cooling down the arm can hold its shape while supporting a heavy weight, see FIG. 10 (b, c). The molten metal is also able to recrystallize with itself, therefore it can heal itself if a crack forms in the metal.

Thus, the composite with tuning rigidity is rigid and behaves like a metal in the room temperature while it becomes soft and behaves like a rubber in the temperatures above the melting point of the metal (47° C.). The composite may be fabricated from a low-melting point alloy foam embedded in an elastomer. It can be made in different sizes for different applications including artificial muscles, wearable devices, unmanned aerial vehicles and etc. The polymer matrix of the composite makes it compatible to be used in soft robotic devices where the host is naturally soft and elastic, such as the case of assistive wearable technologies. Furthermore, the composite has shape memory and self-healing capability, and can also be used many times reliably.

Example 3

In this example of the present invention, the composite comprises a PDMS host matrix, Field's metal (FM) particles and NCCF. Field's metal is a eutectic alloy of bismuth, indium, and tin with a low melting point of 62° C. and an elastic modulus of roughly 9 GPa in a solid state. NCCF fillers bridge between FM particles in the composite and create electrically conductive paths throughout the bulk material. Electrical resistance of the composite can be tuned with the volume fraction of the FM and NCCF fillers such that the pieces of bulk material can be directly Joule-heated and softened.

FIG. 11 illustrates the principle of operation for an electrically conductive, stiffness tunable composite. FIG. 11(a) shows that the composite is rigid in the room temperature (panel 1) and can hold a 50-gram weight in a single cantilever beam configuration with a small deflection at the tip of the beam (panel 2). When the structure is heated using a heat gun (panel 3), the whole beam softens, and results in a large deflection under the same weight at the tip of the beam. The structure can hold the deformed configuration in the cold state (panel 4) after removing the weight. The beam recovers its initial configuration again when heated above the melting point of the FM, due to the shape memory effect, with a small deflection at the tip of the beam potentially due to slippage in clamping on the right side (panels 5 and 6). FIG. 11(b) demonstrates that some part of the beam can be selectively activated with direct Joule-heating with a reasonable power requirement. FIGS. 11(c) and (d) show scanning electron microscope (SEM) images of the cross section of PDMS-FM and PDMS-FM-NCCF composites. It can be clearly seen in FIG. 11(d) that the NCCF fillers bridge between the FM particles to create the conductive pathways.

Referring to FIG. 12(a), the elastic moduli of the PDMS-NCCF, PDMS-FM, and PDMS-FM-NCCF composites are presented both for the rigid and soft states. The elastic modulus of PDMS in these calculations is considered to be 4 MPa since the PDMS is over-cured in the fabrication process. The addition of NCCF or FM particles as fillers separately to the PDMS host matrix increases the elastic modulus of the composite. When both fillers are blended into the PDMS host matrix, the elastic modulus and the stiffness change ratio of the composite between the rigid and soft states are functions of the volume fraction of these components inside the material. FIG. 12(b) illustrates that by increasing the volume fraction of the NCCF filler in the composite, the stiffness change ratio decreases since the NCCF fillers do not soften during activation.

However, the addition of NCCF fillers to the mix increases the electrical conductivity in the expense of decreasing the stiffness change ratio. FIG. 13 shows the electrical resistance of the PDMS-NCCF and PDMS-FM-NCCF composites at different operating temperatures. The resistance is reduced to a reasonable value for composite with the volume fractions of 45.6%, 45.6%, and 8.8% for PDMS, FM, and NCCF, respectively. This material can be Joule-heated using a reasonable power requirement and creates the opportunity for integration with untethered soft robots.

What is claimed is:

1. A composite material having a tunable stiffness, comprising:
    an elastomeric matrix having an elastic modulus between 10 kPa and 1 MPa;
    a metallic component combined with the matrix, wherein the metallic component comprises a plurality of metal alloy particles having a diameter between 5 and 50 micrometers and a melting point that is above room temperature and no more than 62 degrees Celsius;
    a plurality of conductive fibers combined with the matrix and forming a percolative network with the metallic component; and
    wherein the composite material has a first Young's modulus at room temperature and a second Young's modulus when heated above the melting point of the plurality of metal alloy particles by an application of electrical energy to the composite material such that a ratio of the first Young's modulus to the second Young's modulus is between 4.33 and 5.05 inclusively.

2. The composite material of claim 1, wherein the metal alloy comprises Field's metal.

3. The composite material of claim 1, wherein the plurality of conductive fibers are formed from nickel coated carbon fibers.

4. The composite material of claim 1, wherein the elastomeric matrix is polydimethylsiloxane.

5. The composite material of claim 1, wherein the elastomeric matrix comprises an elastomeric foam.

6. The composite material of claim 5, wherein the metallic component comprises a metallic foam.

7. The composite material of claim 6, wherein the elastomeric foam and the metallic foam form a bicontinuous network.

8. The composite material of claim 7, wherein the elastomeric foam is formed from polydimethylsiloxane.

9. The composite material of claim 8, wherein the metallic foam comprises includes a bismuth alloy.

10. The composite material of claim 1, wherein the elastomeric matrix is present in a volume fraction of between 45 and 60 percent, the metallic component is present in a volume fraction of between 29 and 45.9 percent, and the plurality of conductive fibers are present in a volume fraction of between 8.2 and 11.4 percent.

* * * * *